United States Patent [19]

Nagatsu et al.

[11] Patent Number: 5,220,305
[45] Date of Patent: Jun. 15, 1993

[54] SEMICONDUCTOR PRESSURE SENSOR

[75] Inventors: Keiji Nagatsu, Kawanishi; Michihiro Mizuno, Itami, both of Japan

[73] Assignee: Mitsubishi Denki Kabushiki, Tokyo, Japan

[21] Appl. No.: 767,627

[22] Filed: Sep. 30, 1991

[30] Foreign Application Priority Data

Feb. 1, 1991 [JP] Japan .................................. 3-031429

[51] Int. Cl.$^5$ .............................................. G01L 1/22
[52] U.S. Cl. ............................................ 338/3; 338/5
[58] Field of Search ............................ 338/2, 3, 4, 5; 437/901, 921; 73/708, 720, 721, 727

[56] References Cited

U.S. PATENT DOCUMENTS

| | | | |
|---|---|---|---|
| 4,320,664 | 3/1982 | Rehn et al. | 73/708 |
| 4,404,539 | 9/1983 | Yamada et al. | 338/3 |
| 4,462,018 | 7/1984 | Yang et al. | 338/3 |
| 4,556,807 | 12/1985 | Yamada et al. | 338/3 X |
| 5,002,901 | 3/1991 | Kurtz et al. | 437/228 |

Primary Examiner—Marvin M. Lateef
Attorney, Agent, or Firm—Leydig, Voit & Mayer

[57] ABSTRACT

A semiconductor pressure sensor chip has a pattern including first diffusion sections in which external connection contacts are formed. Resistors are connected to the first diffusion sections through second diffusion sections in a bridge circuit such that the distances between a contact and the second diffusion sections connected to a first diffusion section where the contact is disposed are equal. This arrangement reduces drift of the offset voltage with changes in temperature, thus providing a high precision semiconductor pressure sensor with an improved yield.

2 Claims, 2 Drawing Sheets

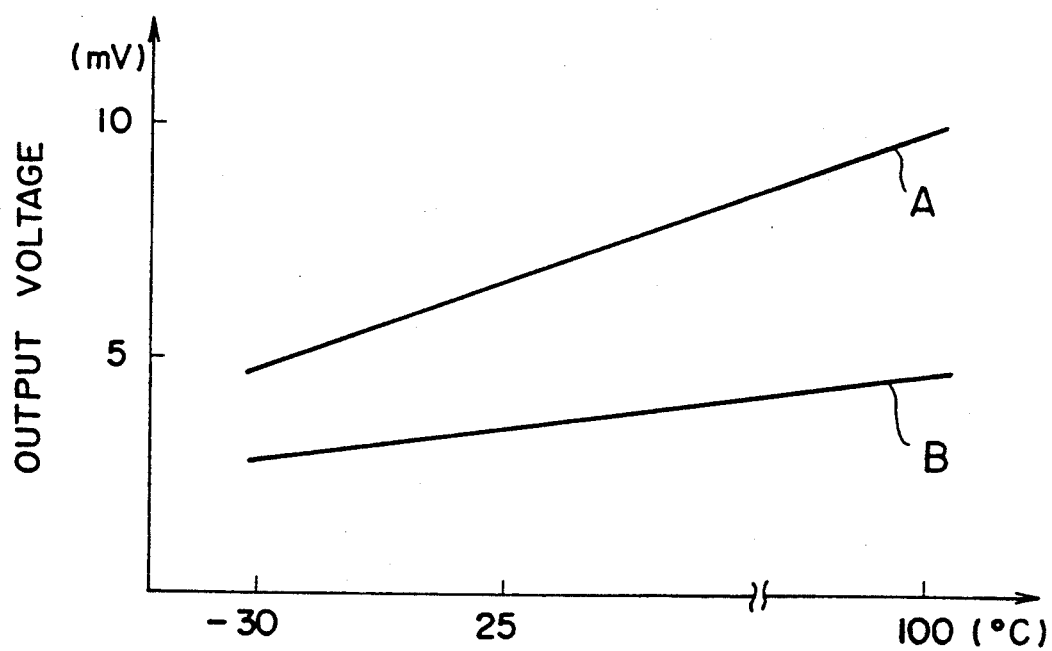

SEMICONDUCTOR PRESSURE SENSOR

BACKGROUND OF THE INVENTION

1. Field of the Invention

This invention relates to a semiconductor pressure sensor, and, more particularly to a pattern configuration of a semiconductor pressure sensor chip.

2. Description of the Related Art

FIG. 3 is a sectional view illustrating a pattern configuration of a conventional semiconductor pressure sensor chip. In this figure, a bridge circuit is formed with gauge resistors 2 on the pressure sensor chip 1. These gauge resistors 2 are connected through diffusion sections 3 composed of resistance layers containing diffused dopant impurities. In each diffusion section 3 there is provided a contact 4 for an external connection.

In the pattern of the pressure sensor chip 1, each diffusion section 3 is connected to form the bridge circuit of the gauge resistors 2. These diffusion sections 3 have simple configuration, however, each diffusion section has different distances from the contact 4 therein to the respective two gauge resistors 2 contacted by the section through the diffusion section 3, i.e., x≠y, as shown in FIG. 3.

The semiconductor pressure sensor mentioned above has a large drift with changes in temperature of the offset voltage, and hence, causes measuring errors, resulting in a low measurement precision.

SUMMARY OF THE INVENTION

Accordingly, an object of the present invention is to provide a semiconductor pressure sensor having a decreased drift with changes in temperature of offset voltage, a high measurement precision and an improved yield. In order to achieve the above-described object, according to one aspect of the present invention there is provided a semiconductor pressure sensor comprising: a plurality of first diffusion sections, each first diffusion section having the same configuration, each of the first diffusion sections having a contact formed therein for making an external connection; a plurality of second diffusion sections, each second diffusion section having the same electrical resistance, and connected at a first end to one of the first diffusion sections such that the distance between the respective contacts and the respective second diffusion sections connected to the respective first diffusion sections are equal; and a plurality of gauge resistors respectively connected to the second ends of the respective second diffusion sections in a bridge circuit.

BRIEF DESCRIPTION OF THE DRAWINGS

FIG. 2 is a diagram illustrating changes in output voltages according to temperature in a semiconductor pressure sensor according to the present invention and a conventional semiconductor pressure sensor, respectively.

DESCRIPTION OF THE PREFERRED EMBODIMENT

Figure 1:
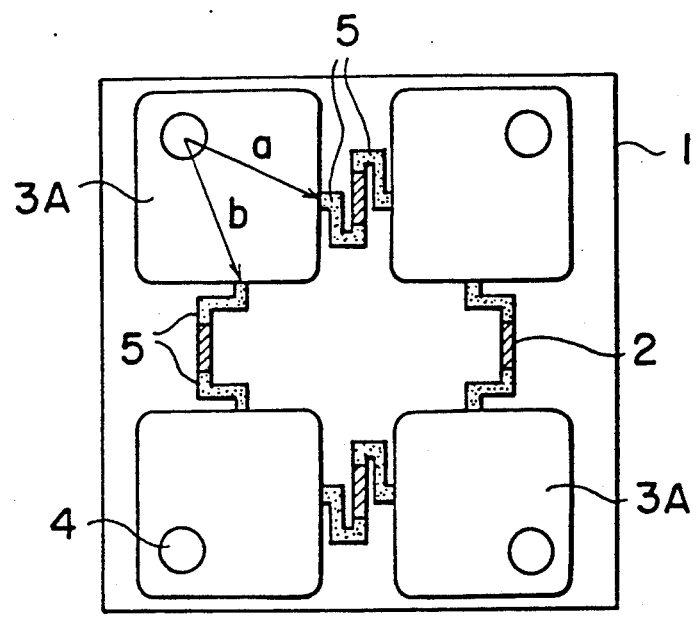
FIG. 1 is a plan view illustrating an embodiment of a semiconductor pressure sensor chip according to the present invention.
Figure 3:
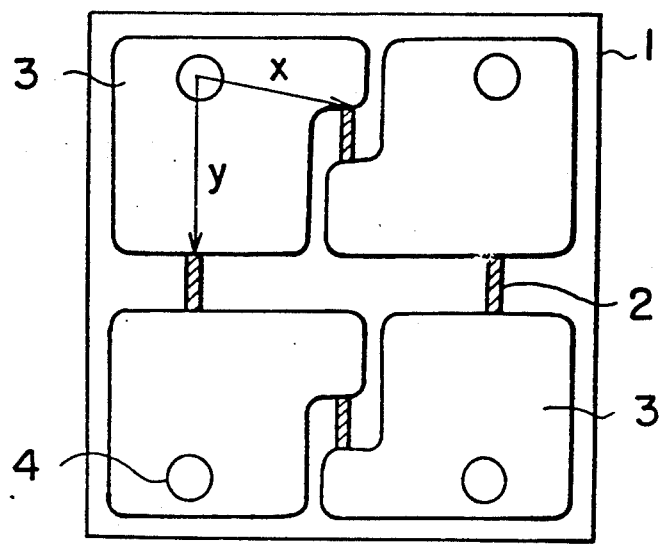
FIG. 3 is a plan view illustrating a conventional semiconductor pressure sensor chip.

FIG. 1 is a sectional view illustrating an embodiment of a semiconductor pressure sensor according to the present invention. Like parts in each figure are identified by the same reference numerals In the pattern configuration in a pressure sensor chip 1, in order to form a bridge circuit with gauge resistors 2, respective gauge resistors 2 are connected to each other through first diffusion sections 3A and second diffusion sections 5, respectively.

In the semiconductor pressure sensor thus constructed, a contact 4 is formed in each first diffusion section 3A for electrically connecting the sensor to an external device. This contact 4 is formed at the same distance from respective second diffusion sections 5 which are connected to each of the first diffusion sections 3A, i.e., a=b, as shown in FIG. 1. In addition, all the second diffusion sections 5 have the same resistance.

A change in output voltage with temperature in the semiconductor pressure sensor will be explained with reference to FIG. 2. When input voltage was determined to be 10V from a DC power supply which is not illustrated, the output voltage changed approximately in the region of 5 to 15 mV in response to a temperature variation between −30° C. and 100° C. in a conventional semiconductor pressure sensor (shown by A). On the other hand, in a semiconductor pressure sensor (shown by B) according to this invention, fluctuations in output voltage narrow to 2 to 3 mV, and hence, drift in offset voltage with changes in temperature is reduced. Accordingly, measurement precision of the semiconductor pressure sensor and the yield can be improved.

What is claimed is:

1. A semiconductor pressure sensor comprising:
   a plurality of first diffusion sections, each of said first diffusion sections having the same configuration, and a respective contact formed in each first diffusion section for making an external connection;
   a plurality of second diffusion sections, each of said second diffusion sections having the same electrical resistance and first and second ends, each of said second diffusion sections being connected at its first end to one of said first diffusion sections such that the distance between the respective contact and said second diffusion sections connected to each of the respective first diffusion sections is equal; and
   a plurality of gauge resistors, each gauge resistor being connected between two of said second ends of two of said second diffusion sections connected to different first diffusion sections in a bridge circuit.

2. A bridge circuit connection arrangement in a semiconductor pressure sensor comprising:
   a semiconductor substrate;
   four spaced apart first diffusion resistive regions in said substrate;
   eight spaced apart second diffusion resistive regions in said substrate, each second diffusion resistive region having a first end connected to one of said first diffusion resistive regions and a second end, two of said second diffusion resistive regions being connected to each of the first diffusion resistive regions;
   a respective contact disposed on each of said first diffusion resistive regions equidistant from the first ends of the second diffusion resistive regions connected to the respective first diffusion resistive region for making an external electrical connection to the semiconductor pressure sensor; and four gauge resistors on the substrate, each gauge resistor being connected to and between second ends of two second diffusion resistive regions respectively connected to different first diffusion resistive regions, the gauge resistors thereby being connected in a bridge circuit.

* * * * *